(12) United States Patent
England et al.

(10) Patent No.: US 7,870,286 B1
(45) Date of Patent: Jan. 11, 2011

(54) METHOD OF, SYSTEM FOR, AND COMPUTER PROGRAM PRODUCT FOR PROVIDING AN E-BUSINESS CONNECTOR BUILDER

(75) Inventors: Laurence E. England, Morgan Hill, CA (US); Howard J. Glaser, San Jose, CA (US); Robert D. Moyer, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 2036 days.

(21) Appl. No.: 09/591,035

(22) Filed: Jun. 9, 2000

(51) Int. Cl.
*G06F 15/173* (2006.01)
(52) U.S. Cl. .................. 709/238; 709/239; 709/240; 709/241
(58) Field of Classification Search ............ 709/226, 709/227, 245, 246, 238, 239, 240, 241
See application file for complete search history.

(56) References Cited

U.S. PATENT DOCUMENTS

| | | | |
|---|---|---|---|
| 4,931,928 A | 6/1990 | Greenfeld | |
| 5,432,942 A | 7/1995 | Trainer | |
| 5,452,449 A | 9/1995 | Baldwin, Jr. et al. | |
| 6,351,776 B1* | 2/2002 | O'Brien et al. | 709/245 |
| 2001/0047402 A1* | 11/2001 | Saimi et al. | 709/219 |
| 2002/0073236 A1* | 6/2002 | Helgeson | 709/246 |

FOREIGN PATENT DOCUMENTS

| | | |
|---|---|---|
| EP | 0990983 | 4/2000 |
| EP | 0-990-983 A1 | 5/2000 |

OTHER PUBLICATIONS

Lundquist, Eric, *Integrating Apps Is Harder Than It Looks (Industry Trend or Event)*, PC Week, Apr. 12, 1999, v16 i15 p. 134 (1).
Sweat, Jeff, *Integration Server Upgrade—CrossWorlds Adds Design Tools to Software, Opens Custom Connector Kit*, Information Week, Mar. 8, 1999, p. 26(1).
Busch, David D., *Upgrade of Site-Building Tool Expands Commerce Capabilities*, Internet World, Feb. 1, 1999, v5 i4 p. 31 (1).

(Continued)

*Primary Examiner*—Vivek Srivastava
*Assistant Examiner*—Adnan Mirza
(74) *Attorney, Agent, or Firm*—Konrad Raynes & Victor LLP; Janaki K. Davda

(57) ABSTRACT

A transaction-based application is adapted to process transactions over a network such as an internet or intranet. The transaction-based application is adapted by scanning the source code of the transaction-based application to identify a transaction and information related to the transaction; storing the related information in a database; extracting from the database parameter definitions describing communication of information by the transaction; identifying a parameter usage type for each parameter, said parameter usage type selectable from the parameter usage type set comprising input, output, input/output, and unreferenced; displaying the transaction and a subset of the related and extracted information; allowing a user to select the transaction; and using the identified and extracted information to package the user-selected transaction in a form compatible with a connector building tool.

18 Claims, 6 Drawing Sheets

OTHER PUBLICATIONS

Sweat, Jeff, *Easier App Integration—BusinessWare's New Graphical Modeling Takes Coding out of Linking Applications*, Information Week, Jan. 4, 1999, p. 24 (1).

Copeland, Lee, *Lotus Tackles Web Integration With Domino Connectors*, Computer Reseller News Oct. 12, 1998 n811 p. 83 (1).

Jurvis, Jeff, *Open Your Store Today*, Information Week Mar. 17, 1997 n622 p. 49 (5).

*Information Builders Integrates Mobile and Wireless With Enterprise Data and Applications*, PR News Wire, May 3, 2000.

*New Connector Development Platform for E-Business Integraton Introduce By Viewlocity*, PR News Wire, Oct. 6, 1999.

Sweat, Jeff, *Easier App Integration—BusinessWare's New Graphical Modeling Takes Coding Out of Linking Applications*, InformationWeek Jan. 4, 1999 p. 24 (1).

Babcock, Charles, *New Tools Bridge Portal Gap*, Inter@ctive Week Oct. 11, 1999, v6 i42 p. 58.

Kerstetter, Jim, *Walker Makes Strides Toward E-Commerce-Based, Financials*, PC Week Oct. 11, 1999 p. 32.

*Response Time*, Enterprise Systems Journal, Sep. 1999 p. 76.

Greenemeier, Larry, *IBM Upgrades Host Integration The Secure Way*, Midrange Systems, Aug. 16, 1999 v12 i12 p. 3.

Dyck, Timothy, *Sun Server Update Gets Java Right: New EJB Support In NetDynamics Streamlines Web Application Development*, PC Week, May 31, 1999 v16 i22 p. 16.

*IBM Unveils Embedded Version of VisualAge for Java Tool*, Computergram International, pNA, May 5, 1999.

Wreden, Nick, *Iona Looks for Life Beyond Corba—Irish ORB Market*, Information Week, Apr. 19, 1999, p. A18 (1).

Dyck, Timothy, *Almost Enterprise-Ready: Bluestone App Server Lacks Manageability*, PC Week, Jun. 22, 1998 v15 n25, p. 35(1).

Vrablik, Rob *That's e-Biz. IBM S/390 Provides An End-To-End Intranet Solution*, Enterprise Systems Journal, Feb. 1998, v13 n2 p. 22 (4).

Bluestone (R) Software Lays Foundation for Internet Operating Environment With Total-E-Server; Union of J2EE's JSP 1.1, Servlets 2.2, and EJB 1.1 Technologies with XML and Bluestone's Legendary Performance Creates Unparalleled E-Business Infrastructure, Business Wire, Jun. 5, 2000.

*IONA Delivers E-business Platform for the Mainframe With the General Availability of iPortal OS/390 Server*, Business Wire, Monday Apr. 3, 2000.

*VisualAge for Java Enterprise Version 2:Data Access Beans, Servlets, CIC Connector*, IBM International Technical Support Organization, Dec. 1998 (SG24-5265-00).

Cremer, K., "A Tool Supporting the Re-Design of Legacy Applications", pp. 1-7, Proceedings of the Second Euromicro Conference on Software Maintenance and Reengineering, Florence Mar. 8-11, 1998.

UK Search Report, Feb. 12, 2002, for International Application No. GB0113283.6.

* cited by examiner

METHOD OF, SYSTEM FOR, AND COMPUTER PROGRAM PRODUCT FOR PROVIDING AN E-BUSINESS CONNECTOR BUILDER

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to transaction processing systems, and more particularly to adapting a transaction-based application to process transactions over a network such as an internet or intranet.

2. Description of the Related Art

In an era of e-business, brick and mortar companies transitioning to the e-business world must retrofit/adapt existing mainframe applications to support customer to business transactions (C2B) as well as business to business transactions (B2B) on the web. These companies have their key applications and data on mainframes as a result of both heritage and the reliability/performance afforded by these systems. To utilize their current mainframe applications and data stores, IT shops need programming techniques to pass transactions from web application servers to back end applications residing on the mainframe. Many of these applications use transaction processing subsystems such as the IBM® Customer Information Control System (CICS®) or the IBM® Information Management System (IMS) in conjunction with programming languages such as COBOL or PLI. (IBM® and CICS® are registered trademarks of International Business Machines Corporation in the United States, other countries, or both.) In these systems, the transaction processor runtimes initiate/start programs written in languages, such as COBOL, via pragmatically callable transaction identifiers (ID). The transaction identifiers have associated with them both the program to be called and a definition of the data to be passed to and from the program. The definition and declaration of the data to be passed to and from programs is called the communication area or COMM Area. It is typically contained in COBOL programs and COBOL COPYBOOKs. Through this method of linking together programs and passing shared data, elaborate applications have been built. Unfortunately, these transaction applications have evolved over many years and have been frequently modified. The applications have become large and unwieldy. Many of the original creators have long since retired and have taken knowledge about how these applications work and where to find key parts. Finding these transactions and COMM Area definitions is required to link web technology to mainframe applications.

To further compound the problem, different programming styles and techniques were used in developing these programs. Some programs were written with the transactions neatly separated from the presentation logic (this is called External Call Interface; used in Client/Server CICS product literature or ECI), while others used techniques combining both the 3270 presentation display code with the transaction logic (this called External Presentation Interface; used in Client/Server CICS product literature or EPI). The former ECI method is easily adaptable to connectors and adapters while the latter EPI method is more troublesome since transactions are bound up in the display logic.

In summary, the problems faced by conventional methods in bringing mainframe applications out to the web are:

finding usable ECI transactions where the business logic has been already separated from the 3270 presentation logic;

extracting the key parameter definitions for communicating information to and from these transactions;

identifying which of these parameters are input, output, input/output, and unreferenced; transferring this information to a workstation from a mainframe to build connectors; and pairing connection information with the parameter information.

Conventional methods have failed to provide solutions to these problems. Thus, there is a clearly felt need for a method of, system for, article of manufacture for, and computer program product for providing an improved adaptation of a transaction-based application to process transactions over a network such as an internet or intranet.

SUMMARY OF THE INVENTION

The present invention comprises a method, system, and article of manufacture for adapting a transaction-based application to process transactions over a network such as an internet or intranet. The transaction-based application is adapted by scanning the source code of the transaction-based application to identify a transaction and information related to the transaction; storing the related information in a database; extracting from the database parameter definitions describing communication of information by the transaction; identifying a parameter usage type for each parameter, said parameter usage type selectable from the parameter usage type set comprising input, output, input/output, and unreferenced; displaying the transaction and a subset of the related and extracted information; allowing a user to select the transaction; and using the identified and extracted information to package the user-selected transaction in a form compatible with a connector building tool.

One aspect of a preferred embodiment of the present invention provides that the compatible form comprises a parsable file containing information which can be parsed by a connector building tool.

Another aspect of a preferred embodiment of the present invention generates a documentation file describing the parsable file.

Another aspect of a preferred embodiment of the present invention provides that the documentation file comprises field description information and connection information.

Another aspect of a preferred embodiment of the present invention uses the identified and extracted information to build a connector.

Another aspect of a preferred embodiment of the present invention uses the identified and extracted information to build an enterprise Java bean connector. (Java and all Java-based trademarks are trademarks of Sun Microsystems, Inc. in the United States, other countries, or both.)

Another aspect of a preferred embodiment of the present invention queries the database to find program parts comprising the transaction-based application and to identify relationships between the program parts.

Another aspect of a preferred embodiment of the present invention provides that the related information is a member of the set comprising relationships, call hierarchies, transactions, communication areas, parameters, the flow of data elements, and resources employed.

A preferred embodiment of the present invention has the advantage of providing improved adaptation of a transaction-based application to process transactions over a network such as an internet or intranet.

A preferred embodiment of the present invention has the further advantage of providing an improved user interface for adapting a transaction-based application.

A preferred embodiment of the present invention has the further advantage of providing improved usability in a tool for adapting a transaction-based application.

A preferred embodiment of the present invention has the further advantage of providing improved integration in a tool for adapting a transaction-based application.

A preferred embodiment of the present invention has the further advantage of providing improved functionality in a tool for adapting a transaction-based application.

A preferred embodiment of the present invention has the further advantage of finding transactions.

A preferred embodiment of the present invention has the further advantage of extracting key parameter definitions for communicating information by a transaction.

A preferred embodiment of the present invention has the further advantage of identifying which of these key parameters are input, output, input/output, and unreferenced.

A preferred embodiment of the present invention has the further advantage of transferring this information to a workstation from a mainframe to build connectors.

preferred embodiment of the present invention has the further advantage of associating transaction connection information with transaction parameter information.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

An embodiment of the invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
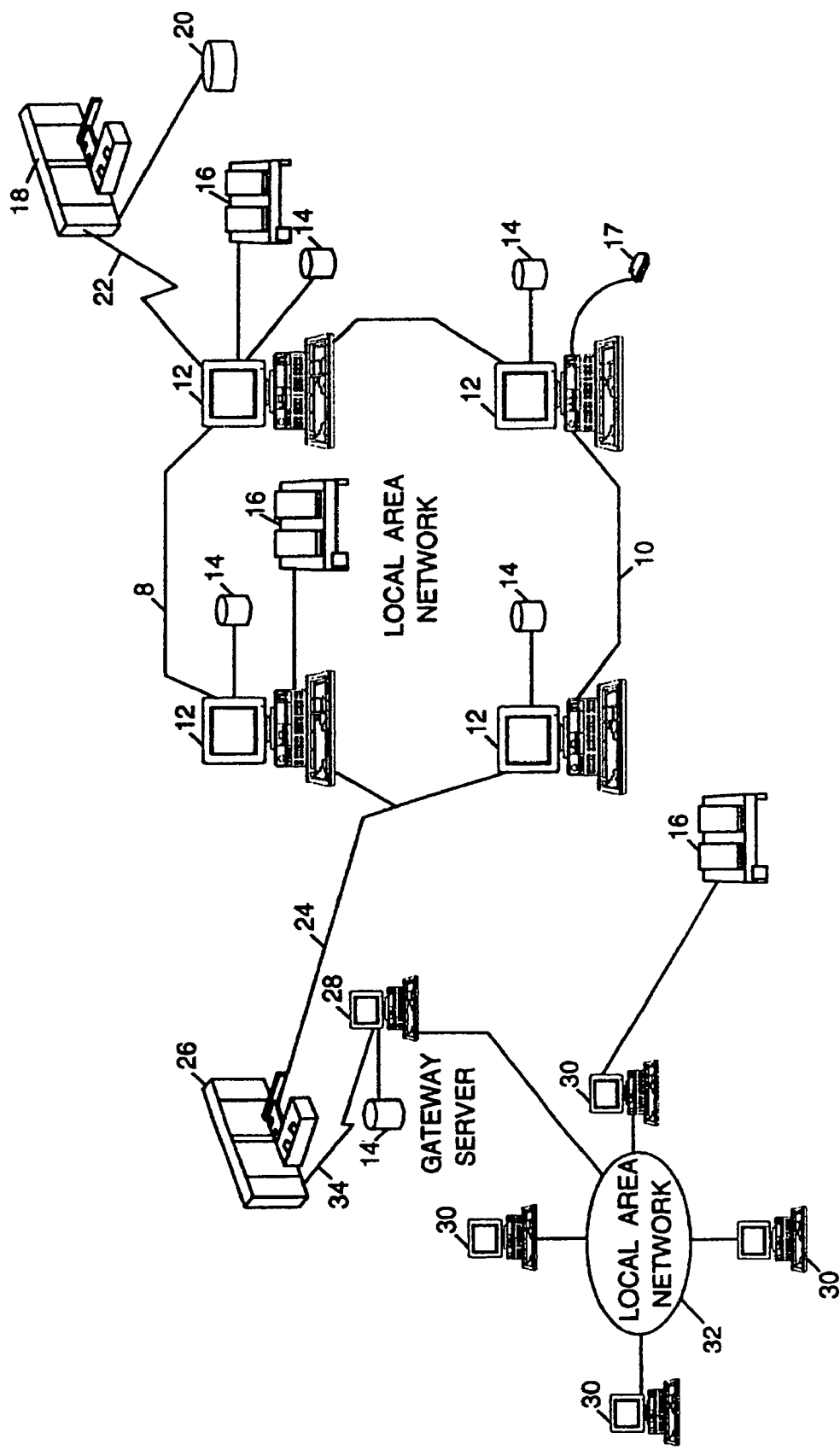
FIG. 1 is a block diagram of a distributed computer system used in performing the method of the present invention, forming part of the apparatus of the present invention, and which may use the article of manufacture comprising a computer-readable storage medium having a computer program embodied in said medium which may cause the computer system to practice the present invention.

Referring first to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Alternatively, networks 10 and 32 may be intranets or portions of the internet. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 may be an IWS which serves to link LAN 32 to LAN 10. Preferably, server 28 is a web application server which passes transactions from a requester 30 on the internet 32 to the mainframe 18 upon which a back-end application serving the transaction is executing.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

As will be appreciated upon reference to the foregoing, it is often desirable for a user to link a transaction-based application on the mainframe 18 to the internet 32 and/or World Wide Web (web), where the transaction-based application was not originally designed for web or internet based transactions. It is also desirable for this user to perform this application development on a workstation 12 in lieu of performing the application development on the mainframe 18 itself. A preferred embodiment of the present invention provides capabilities to assist such a user in performing such an adaptation of the transaction-based mainframe application to enable it to process transactions over a network such as the internet or web.

Figure 2:
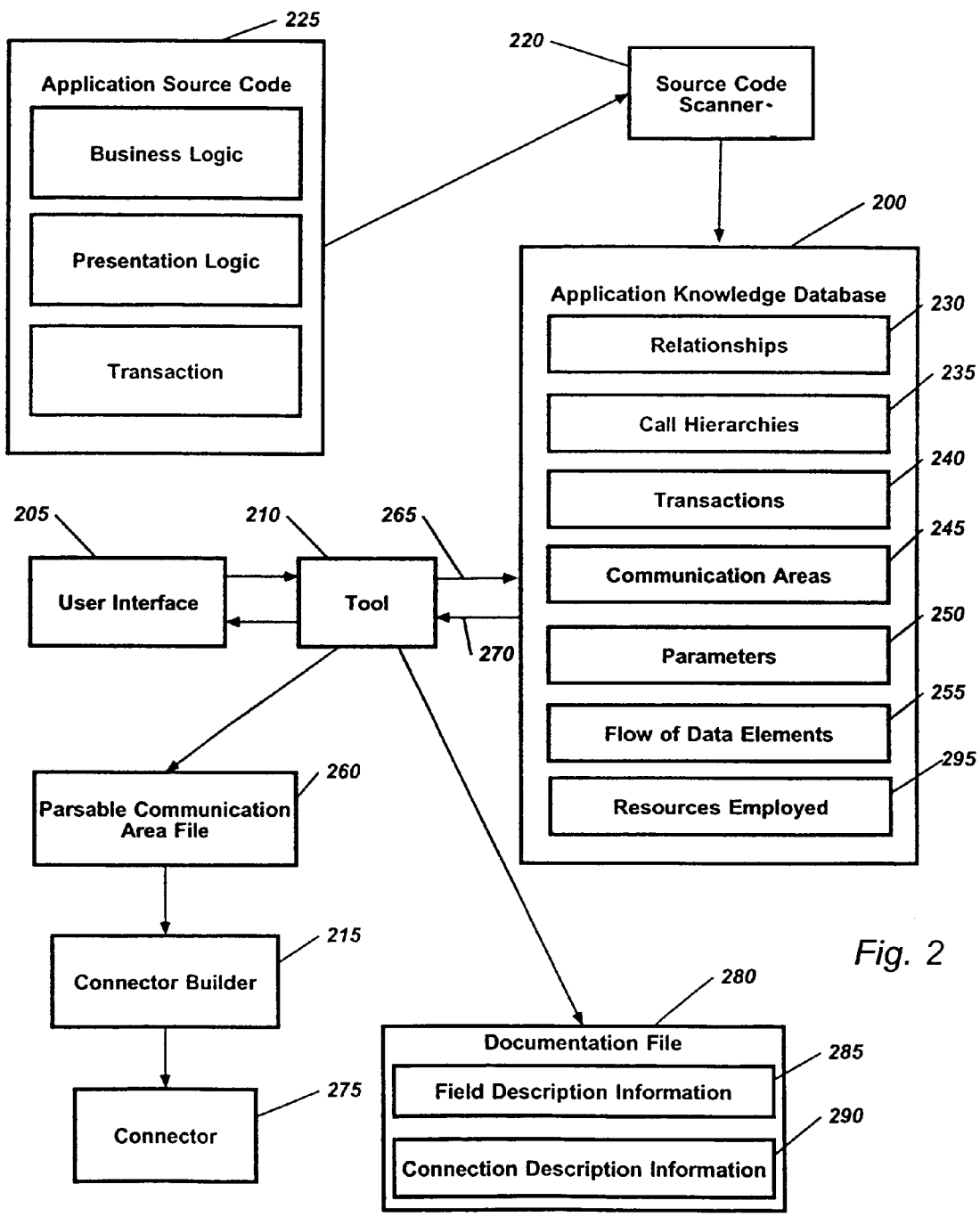
FIG. 2 is a block diagram of a preferred embodiment of the present invention.

Referring now to FIG. 2 illustrating a block diagram of a preferred embodiment of the present invention, the preferred embodiment comprises two key components:

- an application knowledge database 200, preferably stored in an IBM® DB2® relational database; and
- a tool comprising a user interface 205 which displays transaction information and an analysis/packaging tool 210 which packages user selected transactions in a form consumable for web component connector building tools 215. (IBM® and DB2® are registered trademarks of International Business Machines Corporation in the United States, other countries, or both.)

The application knowledge base 200 is loaded by a source scanner 220 which scans (process block 310) the application source code 225 to find relationships 230, call hierarchies 235, transactions 240, communication areas 245, parameters 250, the flow of data elements 255, and resources employed 295, such as database table access, transient data queues, and basic mapping support (BMS) maps. Once loaded (process block 315) into preset database schemas, the database 200 can be queried to find program parts and identify relationships between program parts.

The invention contained herein is an application which uses the information stored in the database 200 (process block 320) to display callable ECI transactions contained within specified CICS Regions (process block 330), provides an indication as to the usage of parameters, either input, output, input/output, or unreferenced (process block 325), and creates a file 260 in a form which can be consumed by a connector building tool 215 such as the IBM Enterprise Access Beans (EAB) or the Microsoft COMTI Builder (process block 340). (Microsoft is a trademark of Microsoft Corporation in the United States, other countries, or both.)

Figure 5:
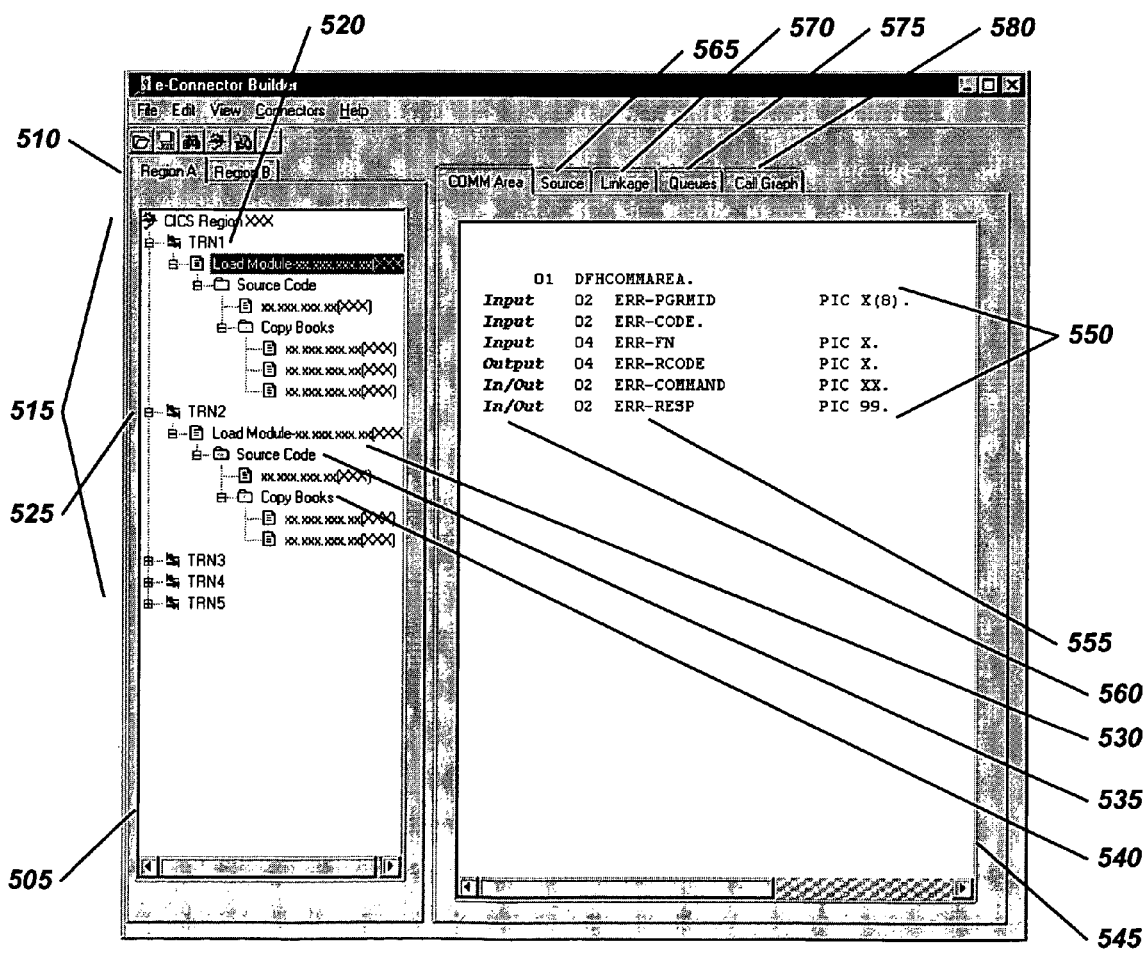
Figure 6:
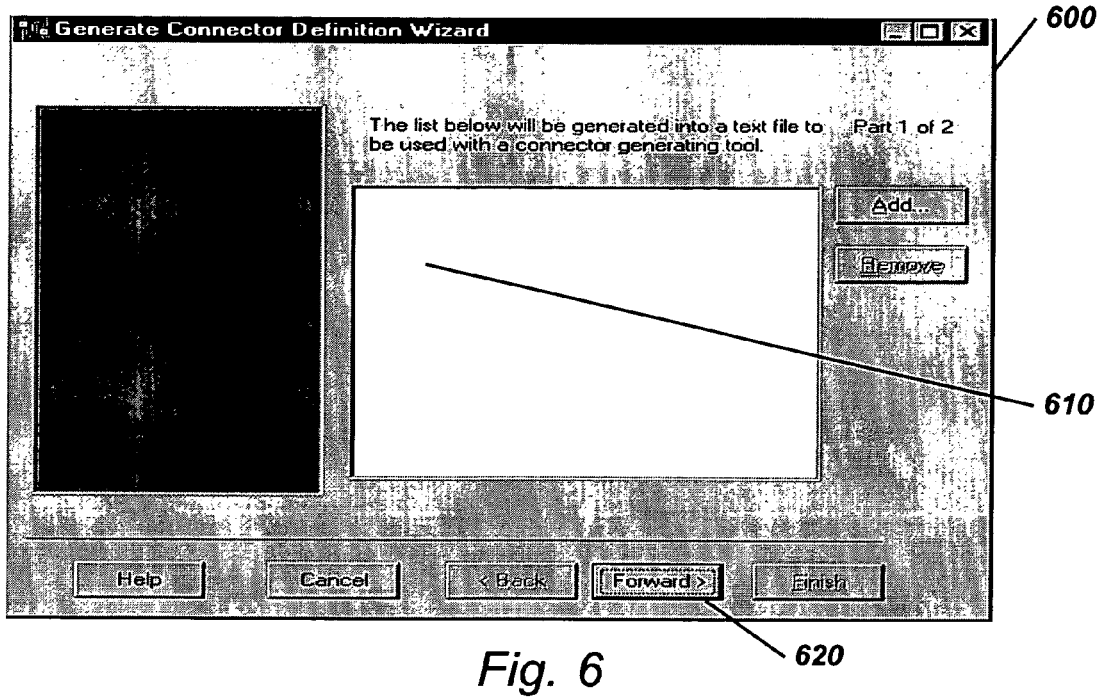
Figure 7:
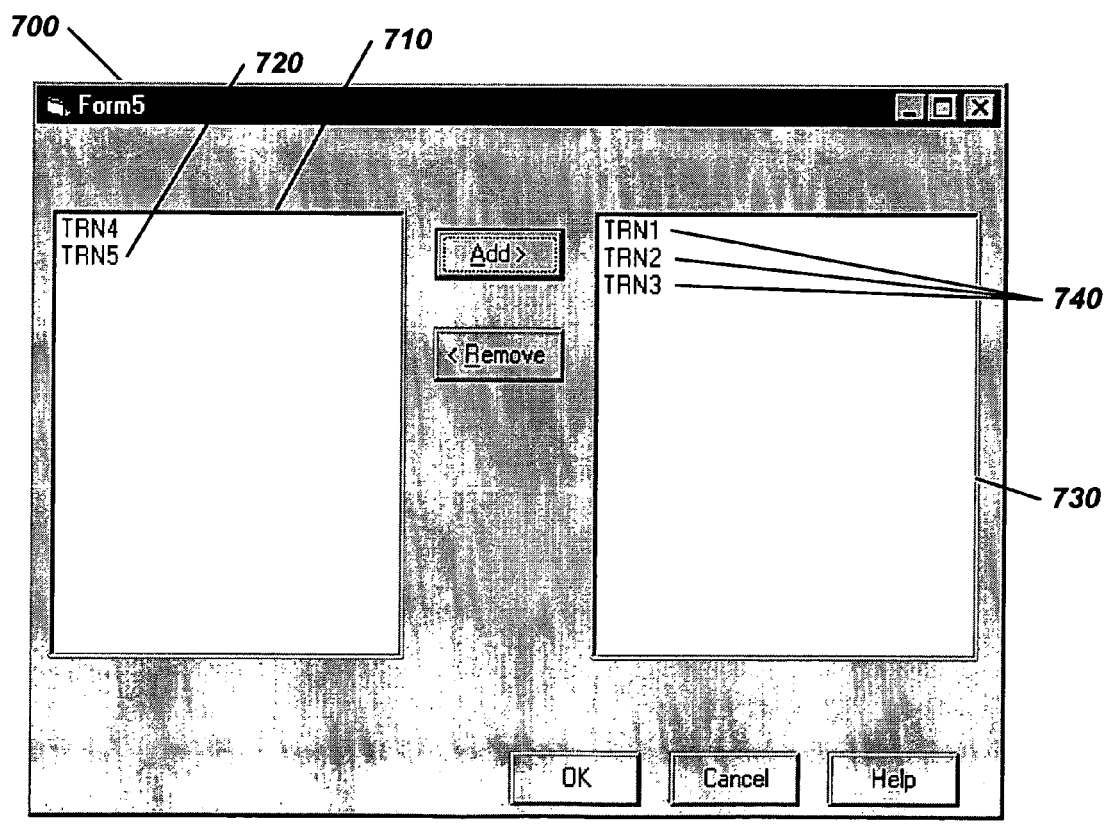
Figure 8:
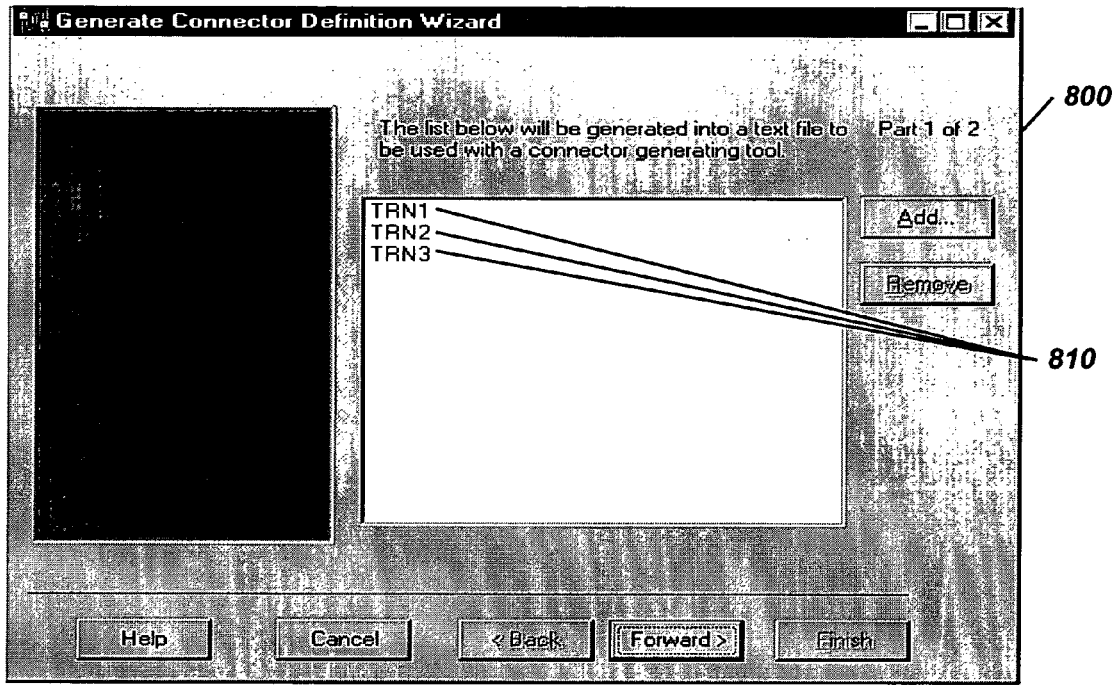
Figure 9:
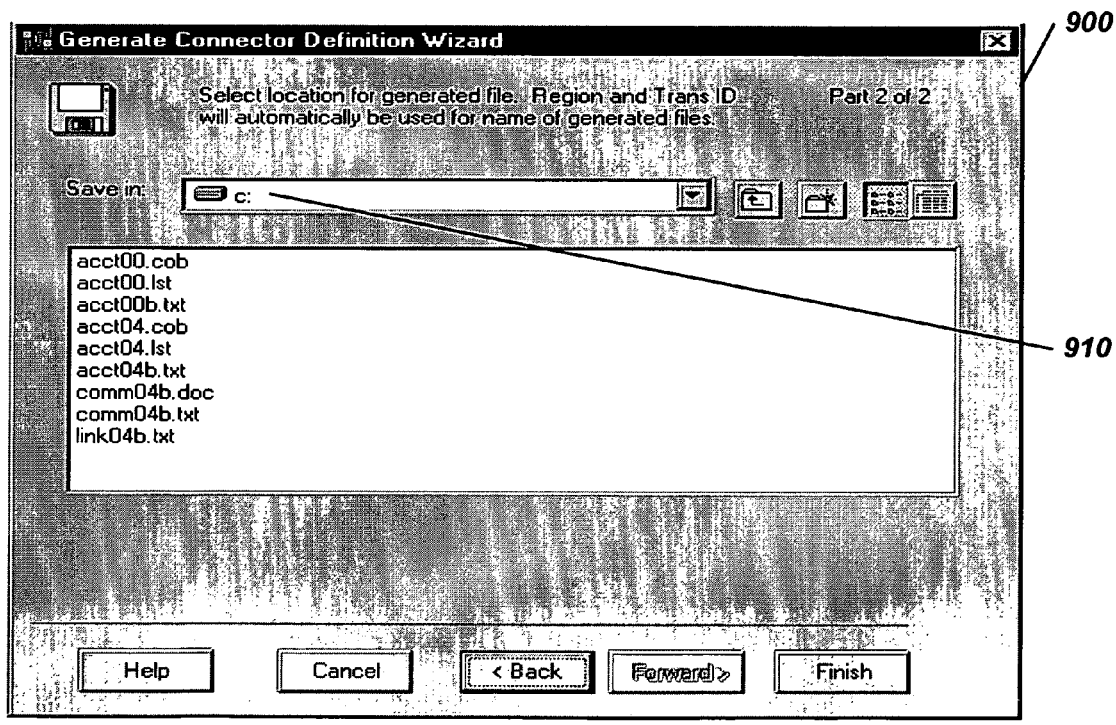

Referring now to FIG. 5, the left hand tabbed pane 505 displays CICS regions 510 in a tree 515 hierarchically decomposing the transactions (520 and 525) into Load Module 530, Source code 535, and Copy Books 540. The right hand tabbed page 545 offers various views on the parts of the transaction components such as the COMM Area 550 shown in the right hand pane 545 of FIG. 5 (process block 330). This not only shows the parameters 555 that are usable from this transaction 520, but also the parameter type 560 as to whether they are input, output, input/output, or unreferenced parameters (process block 325). The information display (process block 330) is based on the information stored (process block 315) in the knowledge base database 200. In the case of the nomination of input, output, input/output, or unreferenced by the database 200 and the tool 210, the tool 210 lets the user override those assignments 560. When an ambiguity exists, a pessimistic view of input/output is taken.

Other views include the original source code 565, the CICS Linkage section 570 of the COBOL program, CICS Queues 575, and a Call Graph 580 depicting transaction and program call relationships. This information is constructed via under the cover queries by the tool 210 against the knowledge relation database 200.

Figure 4:
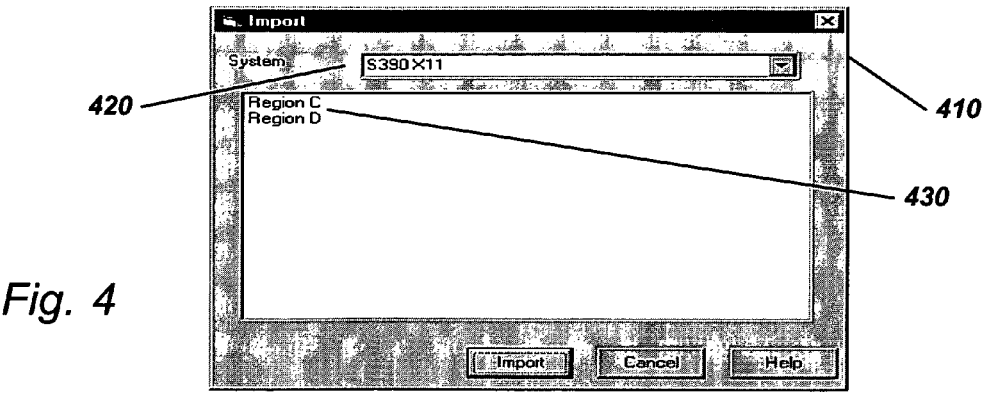
FIG. 4 through FIG. 9 illustrate graphical user interfaces preferred in carrying out the preferred embodiment of the present invention.

Referring now to FIG. 4, the tool 210 is loaded by a dialog 410 which, via a query 265 to the database 200, displays machine/link pack area (LPAR) names 420 and CICS regions 430 contained within. This dialog 410 is found under the File item of a task bar and is labeled Import Region. Once a machine/LPAR 420 and Region 430 are selected, a query 265 is issued against the database 200 to retrieve a list of CICS ECI transactions and their parts contained in the selected region (process block 320). The returned information 270 is used to construct the tree view 515 and populate the editors and views on the right hand pane 545 as illustrated in FIG. 5 (process block 330).

After the tool 210 is loaded with the information 270 on a CICS region, the user can select transaction IDs to be used in a connector 275 (process block 335) and the tool will construct (process block 340) two files per transaction: a communication area file 260 and a documentation file 280. The communication area file 260 contains an ASCII readable COMM Area file which can be parsed by a connector builder application to build a connector (process block 345), such as those which import COBOL and COPYBOOK files. The documentation file 280 provides documentation about the communication area file 260 including field description information 285 and connection information 290 such as OS/390 machine, LPAR, CICS Region name. Both the communication area file and the documentation file 280 may be implemented as a meta-language file, preferably as an Extensible Markup Language (XML) file. Both of these files will automatically be given a name by combining the region name and the transaction ID. Selecting and building these files is via a wizard comprising the sequence of display screens 600, 700, 800, and 900 as depicted in the window sequences illustrated in FIGS. 6, 7, 8, and 9.

The wizard first displays the view 600 comprising a list 610 of the user-selected transactions for which the communication area file and documentation file will be generated. Initially, this list 610 is empty as the user has not selected any transactions. Clicking on the Forward button 620 to proceed with the process causes the wizard to display the view 700 which allows the user to add or remove transactions from the selected list. The left hand view 710 lists the transactions 720 in the CICS region, and the right hand view 730 lists those transactions 740 selected by the user. After the user has selected the transactions, view 800 is displayed which now comprises a list 810 of the user-selected transactions for which the communication area file and documentation file will be generated. Clicking on the Forward button 820 to proceed with the process causes the wizard to display the view 900 which allows the user to select a storage location 910 for the generated files.

Figure 3:
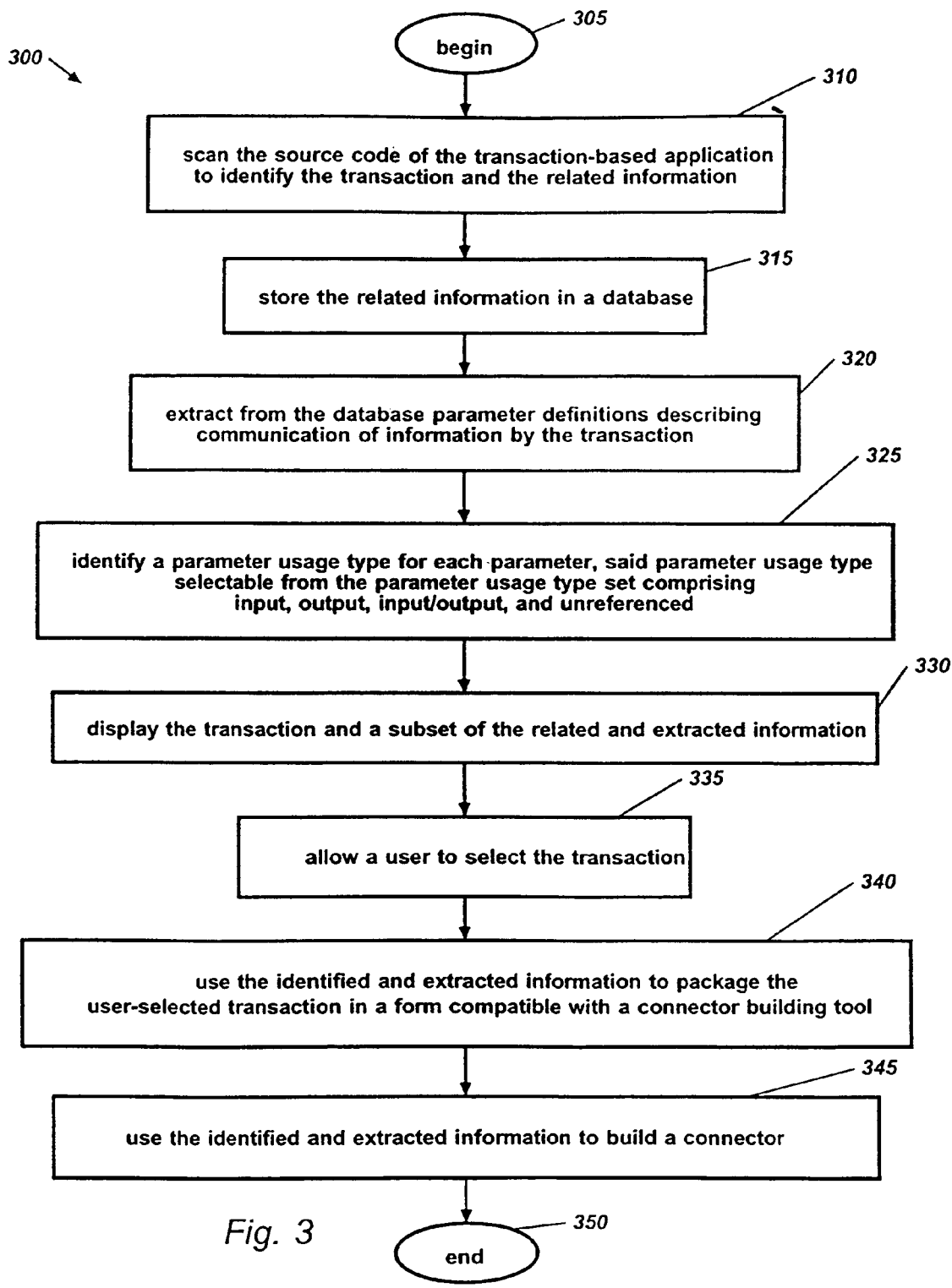
FIG. 3 is a flowchart illustrating the operations preferred in carrying out the preferred embodiment of the present invention.

Referring now to FIG. 3, the flowchart illustrates the operations preferred in carrying out the preferred embodiment of the present invention. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language. The process 300 of adapting a transaction-based application to process transactions over a network such as an internet or intranet begins at process block 305. Thereafter, process block 310 scans the source code of the transaction-based application to identify the transaction and the related information. Process block 315 then stores the related information in a database. From this database, process block 320 extracts parameter definitions describing communication of information by the transaction. For each parameter, process block 325 identifies a parameter usage type, said parameter usage type selectable from the parameter usage type set comprising input, output, input/output, and unreferenced. The transaction and a subset of the related and extracted information is then displayed by process block 330. From such display, process block 335 allows a user to select the transaction. For such a user-selected transaction, process block 340 uses the identified and extracted information to package the user-selected transaction in a form compatible with a connector building tool, and in process block 345 the connector building tool uses the identified and extracted information to build a connector. Thereafter, the process ends at process block 350.

Using the foregoing specification, the invention may be implemented using standard programming and/or engineering techniques using computer programming software, firmware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as Read-Only Memory (ROM), Programmable Read-Only Memory (PROM), etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, central processing unit (CPU), memory, storage devices, communication links, communication devices, servers, input/output (I/O) devices, or any sub-components or individual parts of one or more processing systems, including software, firmware, hardware or any combination or sub-combination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

We claim:

1. A computer-implemented method of adapting a transaction-based mainframe application to process transactions over a network, said transaction-based mainframe application comprising source code describing a transaction and information related to the transaction, hereinafter related information, said method comprising:
   scanning the source code of the transaction-based mainframe application and identifying the transaction and the related information, wherein the transaction-based mainframe application originally does not process transactions over a World Wide Web (Web);
   storing in a database the related information identified in the scan of the source code, hereinafter identified information;
   extracting from the database parameter definitions describing a communication of information by the transaction, hereinafter extracted information;
   identifying a parameter usage type for each parameter, said parameter usage type selectable from the parameter usage type set comprising input, output, input/output, and unreferenced, hereinafter identified information;
   displaying the transaction and a subset of the related information and the extracted information;
   receiving user input selecting the transaction; and
   in response to receiving the user input, generating a communication area file that includes a definition and a declaration of the data to be passed to and from the transaction-based mainframe application and a documentation file that provides documentation that describes the communication area file using the identified information and the extracted information; and
   with a connector building tool,
      parsing the communication area file; and
      building a connector using the identified information and the extracted information, wherein the transaction-based mainframe application is enabled to process transactions over the Web.

2. The method of claim 1 wherein the communication area file contains information that is parsed by the connector building tool.

3. The method of claim 2 wherein the documentation file comprises field description information and connection information.

4. The method of claim 1 further comprising using the identified information and extracted information to build an enterprise bean connector.

5. The method of claim 1 wherein the database is queried to find program parts comprising the transaction-based mainframe application and identify relationships between the program parts.

6. The method of claim 1 wherein the related information is a member of a set comprising relationships, call hierarchies, transactions, communication areas, parameters, the flow of data elements, and resources employed.

7. An article of manufacture for use in a computer system for adapting a transaction-based mainframe application to process transactions over a network, said transaction-based mainframe application comprising source code describing a transaction and information related to the transaction, hereinafter related information, said article of manufacture comprising a computer-readable storage medium having a computer program embodied in said computer-readable storage medium which causes the computer system to execute:
   scanning the source code of the transaction-based mainframe application and identifying the transaction and the related information, wherein the transaction-based mainframe application originally does not process transactions over a World Wide Web (Web);
   storing in a database the related information identified in the scan of the source code, hereinafter identified information;
   extracting from the database parameter definitions describing a communication of information by the transaction, hereinafter extracted information;
   identifying a parameter usage type for each parameter, said parameter usage type selectable from the parameter usage type set comprising input, output, input/output, and unreferenced, hereinafter identified information;
   displaying the transaction and a subset of the related information and the extracted information;
   receiving user input selecting the transaction; and
   in response to receiving the user input, generating a communication area file that includes a definition and a declaration of the data to be passed to and from the transaction-based mainframe application and a documentation file that provides documentation that describes the communication area file using the identified information and the extracted information; and with a connector building tool,
    parsing the communication area file; and
    building a connector using the identified information and the extracted information, wherein the transaction-based mainframe application is enabled to process transactions over the Web.

8. The article of manufacture of claim 7 wherein the communication area file contains information that is parsed by the connector building tool.

9. The article of manufacture of claim 8 wherein the documentation file comprises field description information and connection information.

10. The article of manufacture of claim 7 wherein the computer program embodied in said computer-readable storage medium causes the computer system to execute:
    using the identified information and extracted information to build an enterprise bean connector.

11. The article of manufacture of claim 7 wherein the database is queried to find program parts comprising the transaction-based mainframe application and identify relationships between the program parts.

12. The article of manufacture of claim 7 wherein the related information is a member of a set comprising relationships, call hierarchies, transactions, communication areas, parameters, the flow of data elements, and resources employed.

13. A computer system for adapting a transaction-based mainframe application to process transactions over a network, said transaction-based mainframe application comprising source code describing a transaction and information related to the transaction, hereinafter related information, said computer system comprising :
    a scanner for scanning the source code of the transaction-based mainframe application and identifying the transaction and the related information, wherein the transaction-based mainframe application originally does not process transactions over a World Wide Web (Web);
    storage for storing in a database the related information identified in the scan of the source code, hereinafter identified information;
    a query for extracting from the database parameter definitions describing a communication of information by the transaction, hereinafter extracted information;
    an identifying computer program for identifying a parameter usage type for each parameter, said parameter usage type selectable from the parameter usage type set comprising input, output, input/output, and unreferenced, hereinafter identified information;
    a display for displaying the transaction and a subset of the related information and the extracted information;
    an interface for receiving user input selecting the transaction;
    a packaging computer program for, in response to receiving the user input, generating a communication area file that includes a definition and a declaration of the data to be passed to and from the transaction-based mainframe application and a documentation file that provides documentation that describes the communication area file using the identified information and the extracted information; and
    a connector building tool for:
        parsing the communication area file; and
        building a connector using the identified information and the extracted information, wherein the transaction-based mainframe application is enabled to process transactions over the Web.

14. The computer system of claim 13 wherein the communication area file contains information that is parsed by the connector building tool.

15. The computer system of claim 14 wherein the documentation file comprises field description information and connection information.

16. The computer system of claim 13 further comprising:
    the connector building tool for using the identified information and extracted information to build an enterprise bean connector.

17. The computer system of claim 13 wherein the database is queried to find program parts comprising the transaction-based mainframe application and identify relationships between the program parts.

18. The computer system of claim 13 wherein the related information is a member of a set comprising relationships, call hierarchies, transactions, communication areas, parameters, the flow of data elements, and resources employed.

\* \* \* \* \*